Patented May 16, 1933

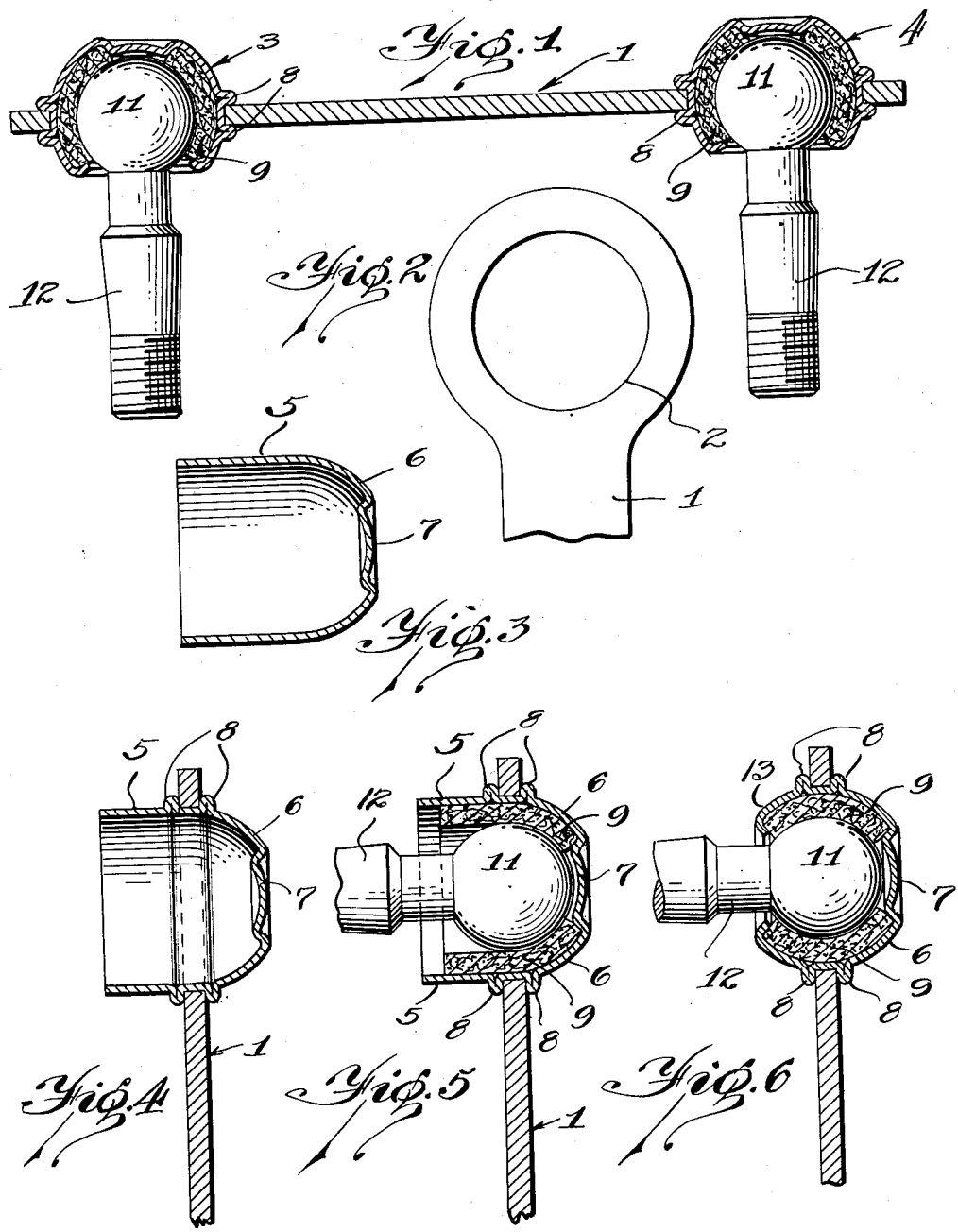

1,909,430

UNITED STATES PATENT OFFICE

NEWTON SKILLMAN, OF DETROIT, MICHIGAN, ASSIGNOR TO O. & S. BEARING COMPANY, OF DETROIT, MICHIGAN, A CORPORATION OF MICHIGAN

CONNECTING UNIT FOR SHOCK ABSORBERS AND THE LIKE

Application filed July 5, 1929. Serial No. 376,057.

This invention relates to a connecting unit for shock absorbers and the like, and has to do particularly with an extremely simple, durable and permanent assembly unit for connecting spaced operating units.

In the design and fabrication of connecting assemblies for spaced operating units many different units have been designed which, while more or less efficient, have usually been complicated and expensive both in design and in structure. Such prior connecting units are well illustrated by the disclosures in the patents to Hassler, 1,508,097, September 9, 1924, and Garman, 1,458,331, June 12, 1923.

It is the purpose of the present invention to provide a connecting or assembly unit which when once assembled, forms an integral locked permanent assembly. More specifically, the connecting unit consists of spaced self-lubricating bearing members which are formed integrally and which enclose ball joints in a permanent locked relation whereby when the unit is once installed, it becomes a permanent, non-adjustable part of the automobile or other mechanism whereby to provide a permanent, fool proof unit at a point which has heretofore been the source of much trouble.

Other features of the present invention reside in the novel manner of fabricating and assembling the unit, as will be more clearly brought out in the specification and claims.

In the drawing:

Fig. 1 is a longitudinal sectional view of a typical unit assembly as applied to a shock absorber design.

Fig. 2 is an enlarged fragmentary view of a preferred form of one end of the link.

Fig. 3 is a sectional view of the preferred form of bearing member prior to being deformed to form the final bearing.

Fig. 4 illustrates the first step in forming the rigid bearing member at the end of the link.

Fig. 5 illustrates the second step wherein the lubricant impregnated fibrous material is inserted into place and preformed and compressed to approximately the right size.

Fig. 6 illustrates the next step of closing in the bearing member around the ball joint whereby to complete the spherical surface of the lubricant impregnated fibrous material and lock the ball joint permanently into position.

The present invention relates primarily to a connecting unit which connects spaced operating members which must have more or less universal movement with respect to each other during normal operation of the device. It is particularly adaptable to shock absorber assemblies but it will be obvious that it is equally well useful in connection with drag links and other similar structures requiring a connecting link assembly.

Two novel features stand out particularly in the present invention. The first feature resides in the rigid, or what may be termed integral, formation of the complete unit so as to form a permanent locked assembly. The other feature resides in the design and expansibility of the bushing material.

The invention may be best described by the method of forming the same, and in Figure 6 I have illustrated the method of forming the invention as embodied in connection with shock absorber design.

The connecting link such as will be used in connection with a shock absorber may be generally designated 1 and such link may be provided with spaced apertures 2 in accordance with the assembly. This link is preferably formed of flat cold rolled steel or the like and is preferably twisted whereby the one bearing member is positioned at a 90° angle to the other. However, in some installations the bearing units will of necessity be parallel and in such cases it will be understood that the link may be reinforced or embossed longitudinally whereby to add strength.

The bearings for each end of link 1 may be generally designated 3 and 4 and the outer shell of each bearing member is preferably formed by providing a substantially cylindrical member 5 which is preferably cup shaped at 1 and as at 6 to give the bushing the proper spherical shape as will be later described. This outer shell or bearing member is also preferably provided with a slight indentation 7 whereby to reduce the amount of bushing material required and to position or locate the same.

The bearing member 5 is next positioned within the aperture 2 of the link and placed in suitable dies whereby the bearing is subjected to end pressure sufficient to distort the cylindrical part of the bearing and to form the angular ridges 8 whereby to rigidly lock the bearing shell in position in the aperture of the link.

A strip of lubricant impregnated fibrous material 9 may be then inserted in the bearing member and subjected to suitable pressure whereby to compress the same and give the interior walls thereof the desired shape. In other words, the interior walls of the lubricant impregnated fibrous bushing adjacent the spherical portion 6 of the bearings are preformed to actual working shape while the outer part of the bearing, as at 10, is left substantially cylindrical to be later closed. It will be understood that this bushing 9 may be formed in different ways, outside the bearing member or after it is placed within the bearing member, the point being that it is preformed in shape and preferably compressed.

The next step consists in closing the ball joint 11 in position as shown in Figure 6. Each ball joint 11 may form an integral part, or may be locked to, suitable studs 12. After being positioned so as to contact with the spherical surface of the bushing member 9, the unit is placed in suitable dies and the cylindrical portion 5 of the outer bearing shell is pressed and deformed as at 13 whereby to complete the spherical shape of the outer bearing and to close in and complete the spherical shape of the bushing 9. This closing in or deforming of the cylindrical part of the bearing is a very important step as it not only positively and permanently locks the ball joint into position but also finally shapes the bushing member and gives the entire bushing 9 additional compression.

It will thus be seen that I have provided a simple connecting link for shock absorbers. and the like wherein the connecting unit itself is rigid, integral, and permanent, and wherein all parts are securely locked together and the bushing is compressed so that it will not only provide a self-lubricating bearing but will gradually expand after continued wear to always securely grip the ball joint to provide a non-adjustable self-lubricating joint.

Although it will be obvious that the inner portion of the fibrous material 9 may be initially preformed and compressed into semispherical shape by many different means, I prefer to preform and compress this inner portion of the fibrous material by the ball member 11, as shown in Fig. 5. In other words, I prefer to eliminate the usual preforming and compressing or sizing operation by inserting the ball member 11 itself in place, thus after the strip of fibrous material is placed in position the next step would be the insertion of the ball member, under suitable pressure whereby to preform and compress the inner portion of the fibrous material after which the cylindrical portion 5 may be closed in as shown in Fig. 6.

In defining the strip of fibrous material 9 as a "bushing", in the specification and claims, it will be understood that I am referring broadly to a compressible expansible packing or material, located between the outer and inner bearing members for assisting in positioning and locking the ball joint in place as distinguished from a mere bearing surface for the ball joint.

What I claim is:

1. In a self-lubricating, self-aligning bearing unit comprising a ball member, an outer bearing housing, said ball member being permanently locked within said bearing housing and an annular layer of lubricant impregnated fibrous material positioned between the housing and the ball member and one end of said housing being closed and shaped to contact with one edge of said annular bushing member and the other end of the housing being turned in to contact with the other edge of said annular bushing member.

2. A self-aligning, self-lubricating unit comprising a ball member, an outer bearing housing, said ball member being permanently locked within said bearing housing and a layer of lubricant impregnated compressible material positioned between the housing and the ball member, the said material being permanenty deformed and compressed so as to act expansively against the ball member, and one end of said housing being closed and formed to contact with a portion of said bushing member and the other end of the housing being turned in to contact with and retain another portion of said bushing member.

3. A self-lubricating, self-aligning bearing unit, comprising a bearing housing, a ball joint within said bearing housing and having a connecting stud protruding therefrom, said bearing housing being permanently distorted and formed to completely surround said ball joint up to a point closely adjacent said protruding stud and a bushing of compressed lubricant impregnated material between said ball joint and bearing housing, said housing adjacent said stub being substantially spherical in shape and having an inturned edge for contacting with and retaining said bushing in place.

4. A self-lubricating, self-aligning bearing unit, comprising a bearing housing, a ball member positioned within the bearing housing and having a connecting stud member protruding therefrom, the bearing housing being permanently formed to substantially completely surround the ball member up to a point closely adjacent said protruding portion, and a bushing of compressed lubricant impregnated fibrous material positioned within the bearing housing and acting expansively upon the ball member and its bearing housing, a portion of the housing wall and the edges of the housing adjacent the protruding portion being formed to engage and retain the bushing in position.

5. A self-lubricating, self-aligning bearing unit comprising a bearing housing, a ball member positioned within the bearing housing and having a connecting stud member protruding therefrom, said bearing housing being permanently formed to substantially completely surround the ball member up to a point closely adjacent said protruding portion, and an annular bushing of compressed lubricant impregnated fibrous material positioned within the bearing housing and acting expansively upon the ball member and the bearing housing, the bearing housing being shaped at one end and being turned in at a point adjacent the protruding portion of the ball member to engage the edges of the annular bushing.

6. A self-aligning bearing unit, comprising an inner ball member, an outer circular bearing shell for said member having one end thereof closed, a portion of said closed end being arcuate in shape, a layer of bushing material compressed between said ball member and the surrounding surfaces of the outer bearing shell, the opposite end of the outer bearing shell from the closed end being deformed to permanently close in and lock the bushing around said ball member and permanently maintain said bushing in its compressed form between the ball member and the outer bearing shell.

7. A self-lubricating, self-aligning bearing unit comprising, an inner ball member, an outer bearing shell surrounding said member, said member being permanently locked within said bearing shell, and a layer of lubricant impregnated fibrous material compressed between the bearing shell and the ball member, one end of said bearing shell being substantially spherical in shape and having an annular indented portion contacting with an annular edge of said bushing member and the other end of said bearing shell being turned in to permanently lock and hold said bushing in compressed form around said ball member.

8. In a permanent, non-adjustable connecting unit assembly of the type having a pair of spaced ball stud joints, a link for operatively connecting said joints and an outer bearing shell for each ball stud rigidly locked to said link, the combination of such an outer bearing shell so formed and shaped as to enclose all of the ball up to a point closely adjacent the stud, the walls of the shell being permanently shaped to lock the ball joint in position, and a bushing of lubricant impregnated compressible material having its walls permanently deformed and compressed by said bearing shell to act expansively against the ball joint.

9. A self-lubricating self-aligning bearing comprising a bearing housing, an inner bearing member having a surface of longitudinally varying contour and a connecting portion protruding therefrom, said bearing housing substantially completely surrounding said inner bearing member up to a point closely adjacent said protruding portion, said inner bearing member being permanently locked within said bearing housing, a layer of lubricant impregnated compressible material positioned between the housing and the inner bearing member, said material being permanently deformed and compressed so as to act expansibly against the inner bearing member and the bearing housing, and one end of said housing being closed and contacting with a portion of said lubricant impregnated material and the other end of the housing having an inturned portion for contacting with and retaining said compressed material in place.

In testimony whereof I affix my signature.

NEWTON SKILLMAN.